United States Patent

Huscroft et al.

[11] Patent Number: 5,889,778
[45] Date of Patent: Mar. 30, 1999

[54] ATM LAYER DEVICE

[75] Inventors: Charles Kevin Huscroft, Coquitlam; John R. Bradshaw, Burnaby; Kenneth M. Buckland, Rohnert Park; Riccardo G. Dorbolo, Burnaby; David W. Wong, Vancouver, all of Canada

[73] Assignee: PMC-Sierra Ltd., Canada

[21] Appl. No.: 827,984

[22] Filed: May 23, 1997

Related U.S. Application Data

[63] Continuation of Ser. No. 503,198, Jul. 17, 1995, abandoned.

[51] Int. Cl.$^6$ ................................................. H04T 3/02
[52] U.S. Cl. .................................... 370/395; 370/469
[58] Field of Search ............................... 370/421, 229, 370/230, 232, 233, 234, 235, 236, 252, 253, 389, 392, 394, 395, 396, 397, 412, 413, 414, 415, 416, 417, 418, 419, 359, 463, 520, 469

[56] References Cited

U.S. PATENT DOCUMENTS

| | | | |
|---|---|---|---|
| 5,197,064 | 3/1993 | Chao | 370/398 |
| 5,274,641 | 12/1993 | Shobatake et al. | 370/94.1 |
| 5,280,475 | 1/1994 | Yanagi et al. | 370/399 |
| 5,485,456 | 1/1996 | Shtayer et al. | 370/60 |

OTHER PUBLICATIONS

Lalk et al, "An OC–12/STS–3C/ATM interface for Gigabit Network Applications", 1993, pp. 868–872.
Oechshin et al, "ALI: A Versatile Interface Chip for ATM Systems", Globecom '92, 1992, pp. 1282–1287.

*Primary Examiner*—Huy D. Vu
*Attorney, Agent, or Firm*—Hall, Priddy & Myers

[57] ABSTRACT

An ATM layer device for interfacing between a physical layer device and an ATM switch, which includes means for prepending and postpending of switch routing information to cells destined to enter the switch and for removing such information from cells having left the switch

30 Claims, 7 Drawing Sheets

| SA | MSB (39) | | | | LSB (0) |
|---|---|---|---|---|---|
| 0000 | Reserved for Search Table | | | | |
| 0001 | MSN (8) | TUC (16) | | Reserved for Search Table | |
| 0010 | Routing ID (12) | VPI (12) | VCI (16) | UDF (8) | PHY ID (8) |
| 0011 | Config. (4) | Status (4) | Extended Status (8) | OAM Config. (8) | |
| 0100 | L#1 (14) | | TAT#1 (26) | | |
| 0101 | L#2 (14) | | TAT#2 (26) | | |
| 0110 | I#2 (20) | | I#1 (20) | | |
| 0111 | Unused (2) | Reserved (2) | Action #1 Action #2 (2) (2) | count of non-compliant CLP=1 cells (16) | count of non-compliant CLP=0 cells (16) |
| 1000 | Output Header (40) | | | | |
| 1001 | Pre/Postpend (40) | | | | |
| 1010 | Pre/Postpend (40) | | | | |
| 1011 | Unused (8) | CLP=0 cell count (32) | | | |
| 1100 | Unused (8) | CLP=1 cell count (32) | | | |
| 1101 | Unused (8) | Current Cell Count (16) | | BIP 16 (16) | |
| 1110 | Backward Reporting Counts SECB (8), Lost Cells (8), Misinserted Cells (8), BIPV (16) | | | | |
| 1111 | Forward Monitoring Counts SECB (8), Lost Cells (8), Misinserted Cells (8), BIPV (16) | | | | |

Fig. 7

ATM LAYER DEVICE

This is a continuation of application Ser. No. 08/503,198, filed on Jul. 17, 1995, now abandoned.

FIELD

The present invention relates to a device which receives asynchronous transfer mode cells (ATM) from multiple physical layer devices, performs a number of ATM layer functions such as cell identification, translation, policing, monitoring and management functions prior to the cells being received by an ATM switch core. The device also receives cells output by the switch core and transmits them to multiple physical layer devices.

BACKGROUND

Asynchronous Transfer Mode (ATM) is a telecommunications concept defined by standards established by the American National Standard for Telecommunications (ANSI) and the International Telephone and Telegraph Consultative Committee (CCITT), a predecessor standards committee to the International Telecommunication Union (ITU), for carriage of a complete range of user traffic, including voice, data and video signals on any User-to-Network Interface (UNI) and to facilitate multi-media networking between high speed devices such as workstations, super computers, routers or bridges. The user network interface converts from one protocol, such as SONET, DS-3, to another such as ATM in going between, in this case, telephone communication lines and an ATM system such as a LAN. In this case, the telephone communications protocol and the ATM system employed at the User Network Interface are called the physical layers and the UNI is called the physical layer device. The physical layer is the lowest level of communication between networks or within a network. The physical layer also communicates with the next highest layer, the ATM layer. Thus, in considering a system consisting of a central office and a network, the physical layer would include the transmission lines or physical medium along which the information travels from central office to the network and back. Alternately, the physical layer within a network could be the physical medium which carries information to and from a given station and interfaces with the next higher layer, which is an ATM layer, for that station. Information would then go to and from the ATM layer, to and from an adaptation layer device and then to and from an end user.

ATM switches are required in order to direct ATM cells between end users, between end users in one ATM network and those in another or from end users in one network through a public network to those in another network. On each side of an ATM switch there is an ATM layer device which performs various functions such as cell identification, translation, policing, monitoring and management.

A cell bus operating according to specifications known by the acronym UTOPIA is widely employed on physical devices in view of its simplicity. The UTOPIA specification provides 53 bytes of 8 bit wide bytes or 16 bit wide words with 27 words per cell.

Accordingly, it is an object of the invention to provide a single ATM layer device which performs all of the functions required in interfacing between an ATM physical layer device and an ATM switch. It is a further object of the invention to utilize a standard UTOPIA cell bus interface in the connection between the physical layer device and the ATM switch core.

SUMMARY OF THE INVENTION

According to the invention there is provided an ATM layer device for interfacing between physical layer devices and an ATM switch, comprising an input cell interface couplable to a plurality of physical layer devices in an egress mode and to an output of the ATM switch in an egress mode. The ATM layer device also has an output cell interface couplable in an ingress mode to an input of the ATM switch and in an egress mode to the physical layer devices. In an ingress mode of operation the input cell interface selects layer device for cell transmission based devices a physical layer device for cell transmission based upon the availability of cells from the physical layer device.

The input cell interface may be couplable, in an ingress mode, to the plurality of physical layer devices by a bus and the output interface is couplable, in an ingress mode, to a plurality of physical layer devices by a bus.

Cell identification may be performed based upon virtual path indicators and virtual channel indicators in combination with identification of a physical layer device from which each cell was transmitted.

Preferably the device includes a single output cell interface capable of interfacing with a plurality of physical layer devices coupled to said input cell interface. By having single input and output cell interfaces which can couple to a plurality of physical layer devices, a given system can be extended to include a greater number of physical layer devices without a corresponding increase in the number of input and output cell interfaces.

Advantageously the device has means for prepending and postpending of switch routing information to cells destined to enter the switch and for removing such information from cells having left the switch and means for selectively activating and deactivating the means for prepending and postpending.

The device may further have a single shared bus capable of coupling to a plurality of physical layer devices and the input cell interface.

By combining physical layer device identification information in the cell prepended and postpended information with VPI/VCI values, cell identification may be made.

BRIEF DESCRIPTION OF THE DRAWINGS

The novel features believed to characterize the invention are set forth in the appended claims. The invention itself, however, as well as other features and advantages thereof, will be best understood by reference to the detailed description which follows, read in conjunction with the accompanying drawings, wherein:

FIG. 7 is a table of virtual channel entries.

DETAILED DESCRIPTION WITH REFERENCE TO THE DRAWINGS

Figure 1:
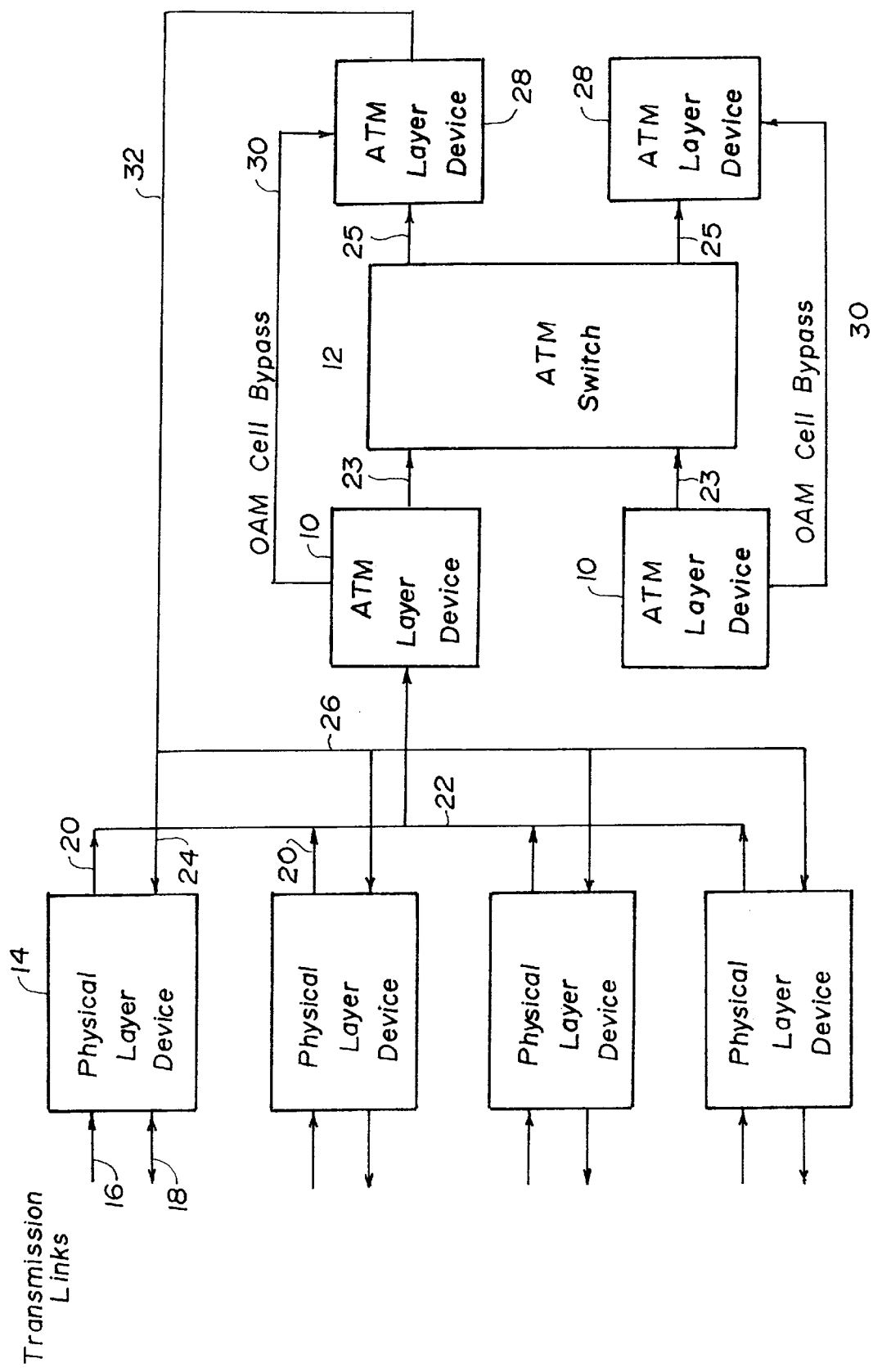
FIG. 1 is a schematic diagram showing the interconnection of the ATM layer device with the physical layer devices and the switch core.

Referring to FIG. 1, an ATM layer device 10 has an input coupled to a UTOPIA bus 22 that connects to a number of physical layer devices 14 and an output coupled by enhanced UTOPIA bus 23 to ATM switch 12. The other side of ATM switch 12 outputs onto an enhanced UTOPIA bus 25 and into ATM layer devices 28. The physical layer devices 14 couple to transmission links 16 and 18 which may be fiber optic lines. The UTOPIA cell bus 30 is used as an operation and management cell bypass which forwards operation and management specifications directly from one ATM layer device 10 on one side of ATM switch 12 to an ATM layer device 28 on the other side without going through the ATM switch 12.

In operation, digital signals received on link 16 which may be from another network or a central office exchange are received by the physical layer device 14 which converts the incoming signals to ATM cells of the correct protocol which are output on the UTOPIA bus 22. The signals on bus 22 are directed to a corresponding ATM layer device 10 which performs all of the required ATM layer functions such as cell identification, cell header translation, adding switch routing information to cells, virtual channel policing, cell counting for billing and monitoring purposes, low priority cell discard during times of switch congestion, performance monitoring and operation and management handling. The cells which have been processed by the ATM layer devices 10 are placed on an enhanced UTOPIA bus 23 capable of handling the information added to each cell by the ATM layer device 10 and then directed to ATM switch 12. Switch 12 can connect to ATM end user devices (not shown) or to a public ATM network equipment (also not shown). The output of the ATM switch 12 is placed on enhanced UTOPIA bus 25 and sent through another ATM layer device 28. The ATM layer devices 28 route the cells on bus 32 to the physical layer device 14 as indicated either by the cell identification or as specified by the ATM switch 12 for each cell.

Operating and Management (OAM) cells are sent on UTOPIA bus 30 to the ATM layer device 28 on the other side of ATM switch 12 bypassing the ATM switch 12. The output of the ATM layer device 28 is directed on UTOPIA bus 32 to one of the physical layer devices 14 as dictated by the routing information contained in the cell.

Figure 2:
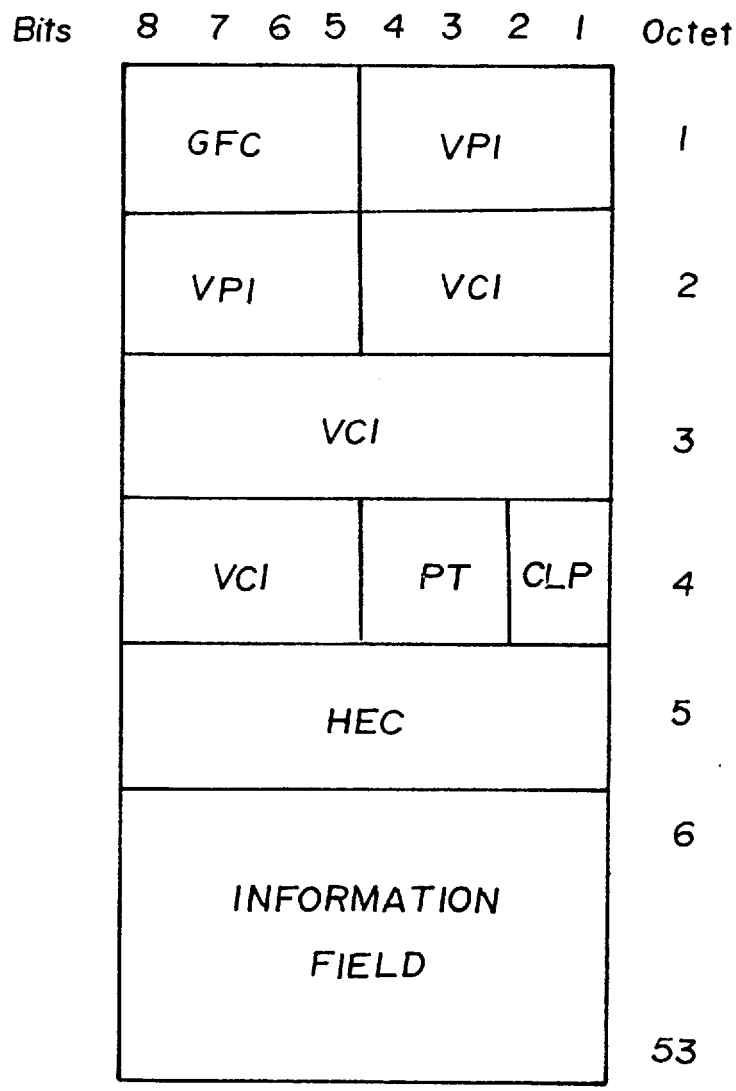
FIG. 2 is a schematic diagram showing the cell structure of a 5-octet header and a 48-octet information field for an ATM cell from a physical layer device.

Referring to FIG. 2 there is shown the cell structure for an ATM cell as transmitted or received by a physical layer device 14. The cell is 8 bits wide, although it could be 16 bits wide as well, and has 53 octets or bytes of which bytes 1 to 5 contain the header information. The lowest bit number in the field represents the lowest order value with bits within an octet sent in decreasing order starting with bit 8. The octets themselves are sent in increasing order, starting with octet 1. For all fields, the first bit sent is the most significant bit (MSB). The information contained in the header includes Virtual Path Identifier (VPI), Generic Flow Control (GFC), Virtual Channel Identifier (VCI), Payload Type (PT), Cell Loss Priority (CLP), and Header Error Control (HEC). The VPI/VCI fields are the routing fields and contain 24 or 28 bits, 8 or 12 bits for VPI and 16 bits for VCI.

Figure 3:
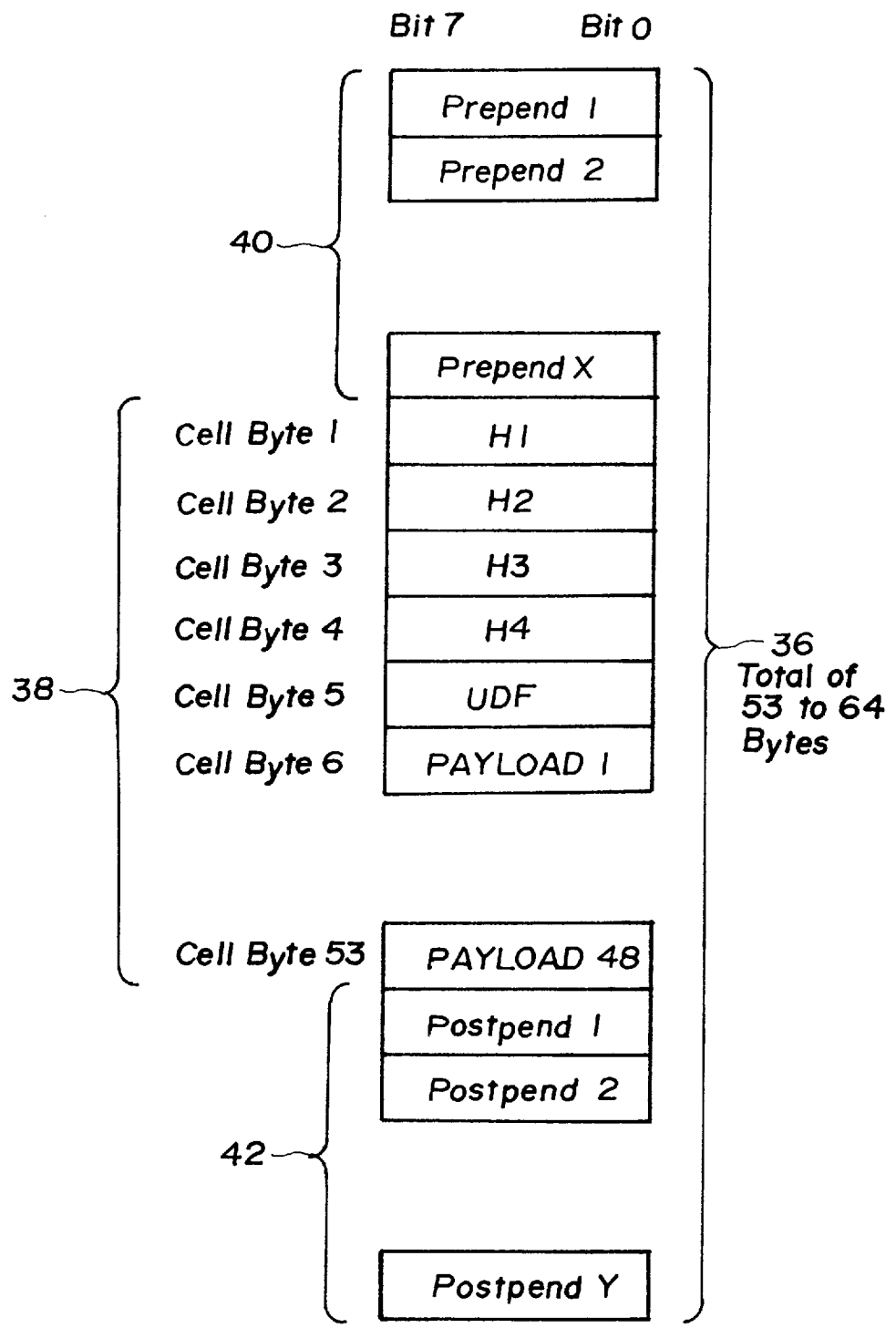
FIG. 3 is a schematic diagram of the UTOPIA 8 bit wide data structure with prepends and postpends.

Referring to FIG. 3, an enhanced UTOPIA bus which includes all of the standard UTOPIA control signals and data buses, also includes the capability of adding prepend bytes 40 and postpend bytes 42. FIG. 3 shows these prepend and postpend bytes 40 and 42, respectively, on an 8 bit wide data structure wherein there are a total of 53 cell bytes and up to a combined total of 10 prepend bytes 40 and/or postpend bytes 42 determined in accordance with the following rule:

$$X>or=0, Y>or=0, X+Y<or=10$$

Figure 4:
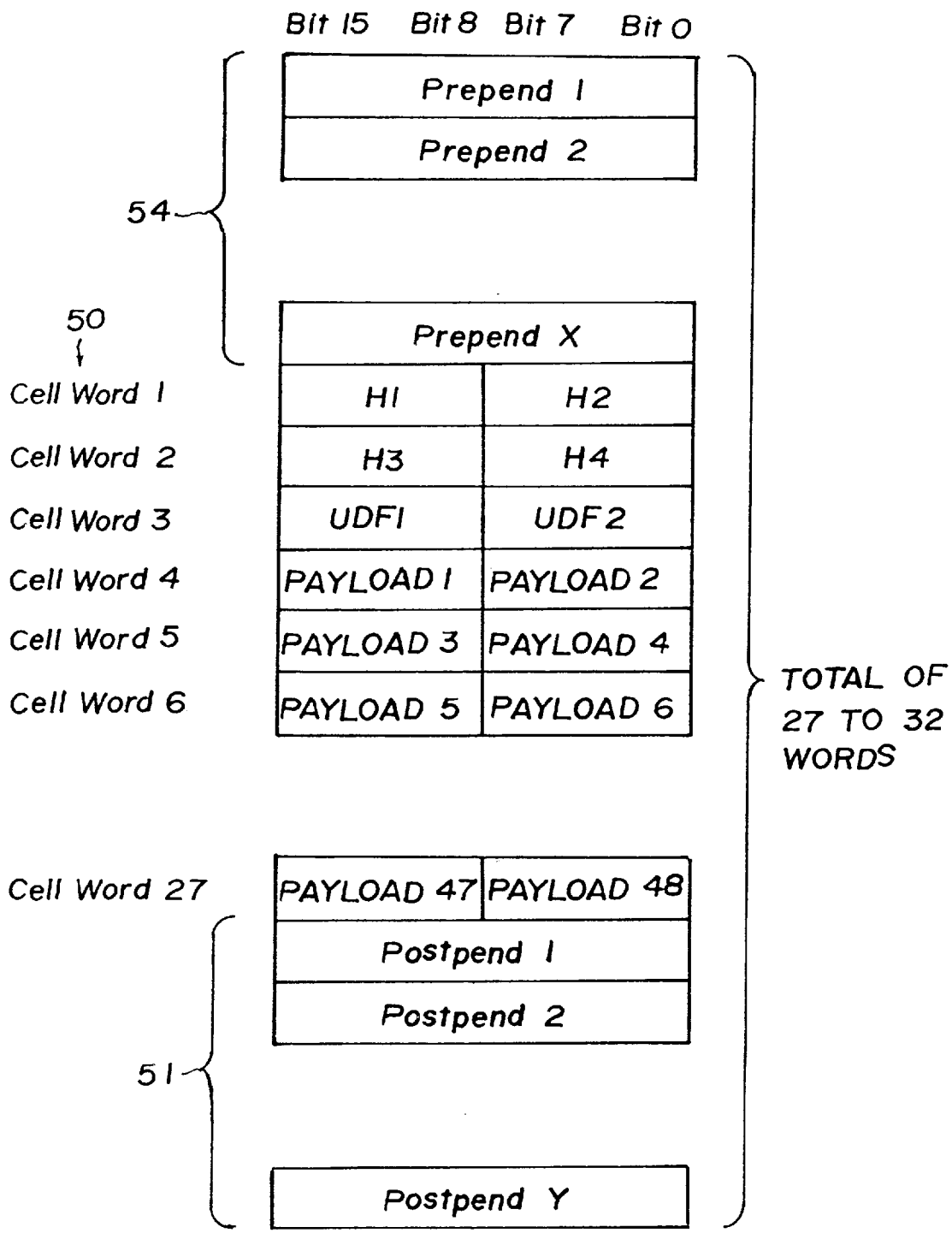
FIG. 4 is a schematic diagram of the UTOPIA 16 bit wide data structure with prepends and postpends.

Referring to FIG. 4, a corresponding 16 bit wide data structure is shown with 27 words 50 for the cell plus a combined total of up to 5 postpends 51 and prepends 54 determined in accordance with the rule:

$$X>or=0, Y>or=0, X+Y<or=5$$

In order to accommodate the extended cell structures, the receive and transmit start-of-cell indicators, must go high for the first byte or word of the extended cell. The receive cell available and transmit cell enable signals, must be maintained for the extra number of cycles required for the entire extended cell to be transferred. Alternatively, new signals could be utilized which remain high for the entire cell transfer period.

ATM cells are identified using the Virtual Path Identifier/ Virtual Channel Identifier (VPI/VCI) in their headers. When cells enter an ingress ATM layer device 10, from multiple physical layer devices 14, the VPI/VCI values may not be unique between different physical layer devices 14. As a result, source information is included with the VPI/VCI value to indicate which physical layer device 14 the cell came from when the cell identification is made. This source information comes from the portion of the ATM layer device 10 or 28 which controls which ATM physical layer device 14 is transferring a cell to it at any one given time.

When cells with prepends and postpends enter an egress ATM layer device 28 from the switch core 12, the identification of those cells may require consideration of the prepended and postpended information. Depending on the switch design, unique cell identification information may be incorporated in that information.

Figure 5:
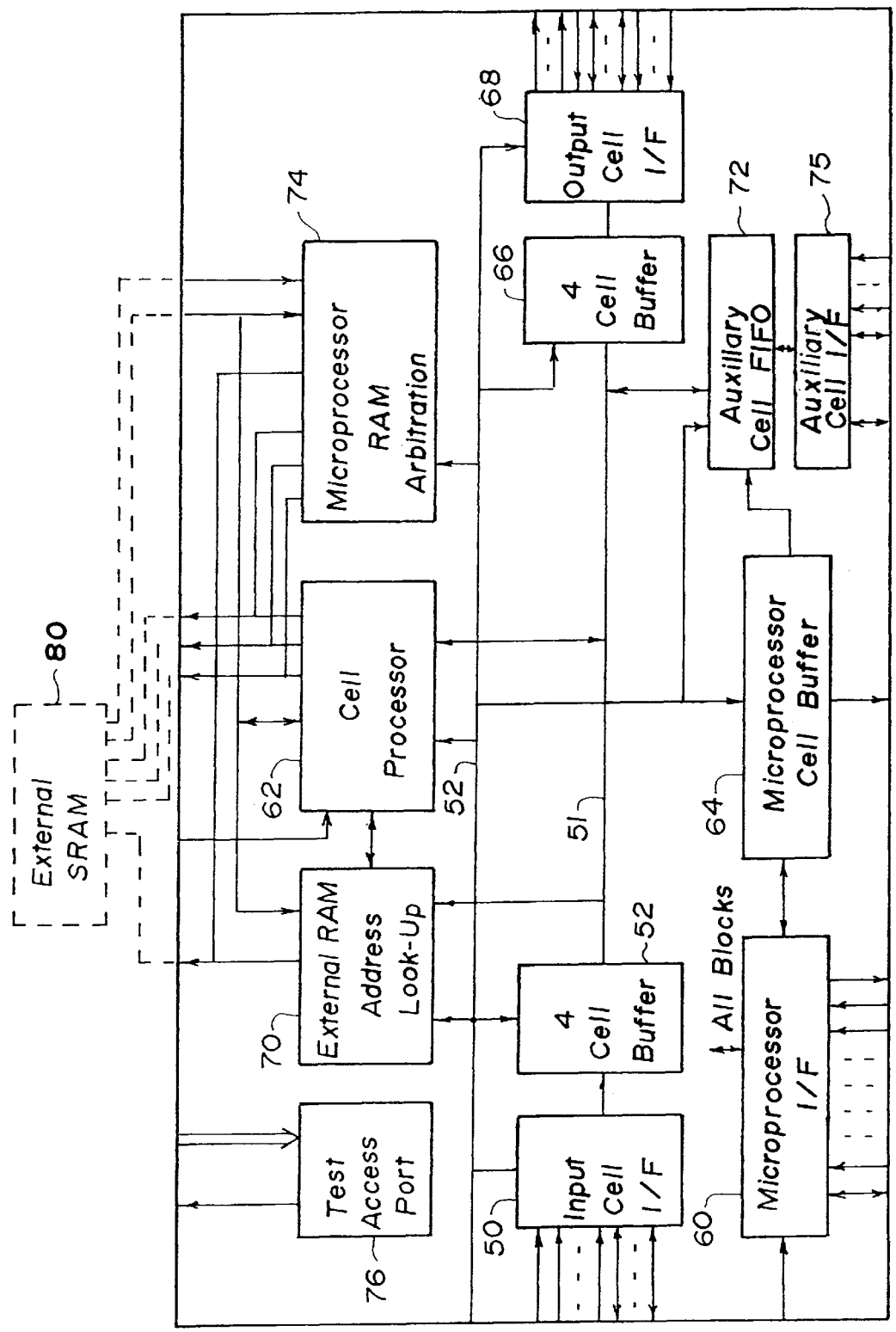
FIG. 5 is a schematic diagram showing details of the ATM layer device.

A more detailed structure for the ATM layer device 10 is shown in FIG. 5 in which incoming cells are received by an input cell interface 50 which can connect to up to 32 physical layer devices 14 when used on an ingress between physical layer devices 14 and a switch core 12, or to the switch core 12 when used on the egress side of the switch 12. The cells arriving at the input cell interface 50 may contain prepended or postpended routing information. Received cells are stored in a 4 cell deep input FIFO buffer 52. The input FIFO buffer 52 provides for the separation of internal timing from asynchronous external devices and filters all unassigned and idle cells. Unassigned cells are identified by an all zero VPI/VCI value and CLP=1 and are filtered with an idle cell count increment.

After passing through buffer 52 cells are placed on an internal bus 51 where they are available to cell processor 62. Cell processor 62 which controls various stages of the cell processing in conjunction with other portions of the ATM layer device 10 such as the external ram address look-up 70, the microprocessor ram arbitration 74, the microprocessor interface 60, the microprocessor cell buffer 64, and the auxiliary cell FIFO buffer 72. An auxiliary cell interface 75, coupled to the auxiliary cell FIFO buffer 72, provides a byte wide Utopia bus port to pass dropped or newly created cells to or from an external device such as backward reporting OAM cells from an ingress to an egress ATM layer device 10. The auxiliary cell interface 75 can be configured as either an input or an output port. The microprocessor interface 60 is provided for device configuration, control, and monitoring by an external microprocessor. Normal mode registers, test mode registers and the external SRAM (not shown) can be accessed through this port. The microprocessor cell buffer 64 is a 4 cell buffer to which cells received on the input cell interface 50 can be routed based on the contents of the cell. The external ram address look-up 70 and the microprocessor ram arbitration 74 support use of an external ram memory by the cell processor 62.

Figure 6:
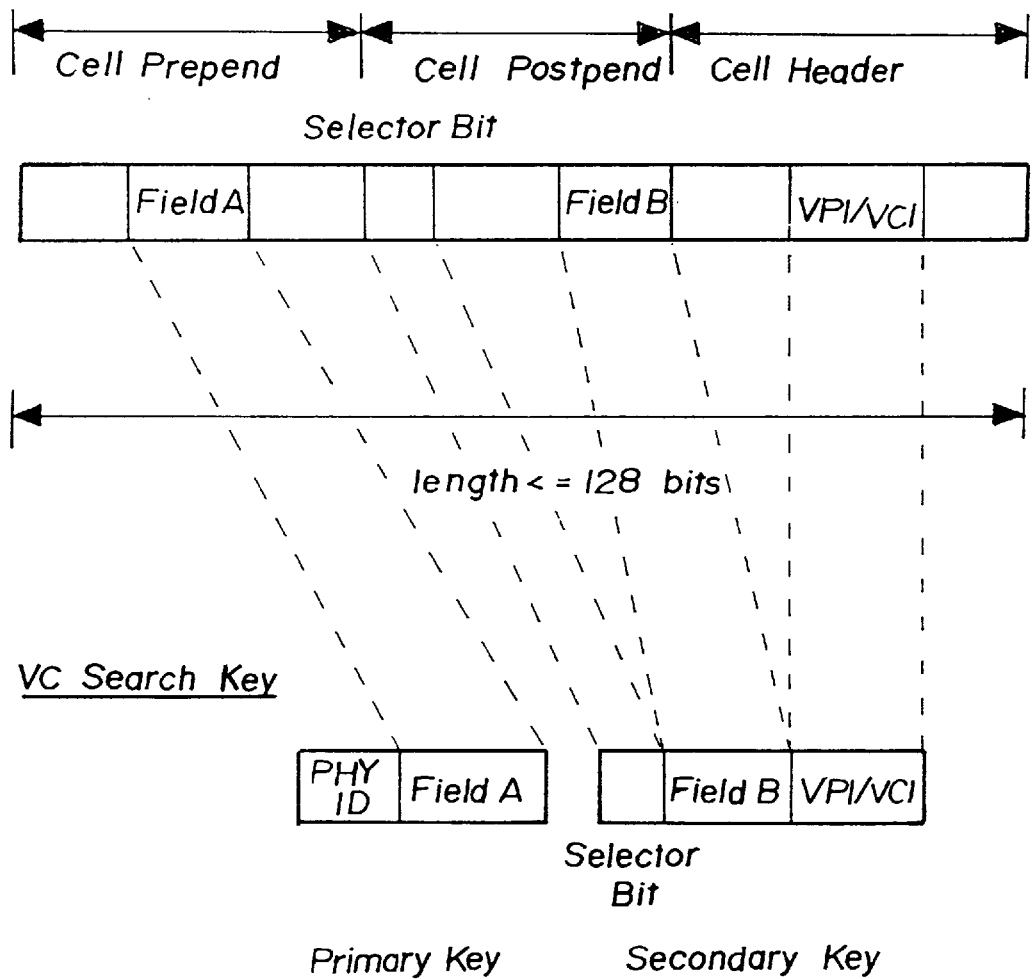
FIG. 6 is a schematic diagram showing the search keys and their concatenation to form a routing word.

After processing by the buffer 52, for the remaining cells, a subset of ATM header and appended bits are used to create a search key as shown in FIG. 6. The search key is divided into two search keys, the Primary Search Key and the Secondary Search Key. The Primary Search Key is constructed with the identification of the physical layer device and Field A while the Secondary Key is composed of three fields. The first field is the Selector bit, the second field is Field B, and the final field is the VPI/VCI taken from the cell's header. Once the search keys are assembled the Primary Search Key is first used to address an external direct look-up table to look up the address of a root node of a search tree. From this root node, the Secondary Search Key is used by a search algorithm to find the cell's virtual channel (VC) table address held in external SRAM 80. The VC table is a table containing entries for cell identification, routing and performance monitoring. If the search process does not lead to the successful identification of the cell concerned, that is no valid VC table address is returned that matches the Secondary Search Key contents, the cell is discarded as invalid. Optionally, the cell is routed to a microprocessor cell interface 60. The VPI/VCI search results in a SA value which points to a VC table entry. The microprocessor 62 retrieves the table entry identified by the SA value. The VC table entry is shown in FIG. 7.

Appended octets on incoming cells are removed after they have been used for VC identification. Once VC identification has been made, new octets contained in the VC table can be appended to each cell. The new octets are contained in locations identified by SA=0011, 1001 and 1010. If the 16 bit bus format is configured on the Output Cell Interface 62, the 8 bit pre/postpend in the SA=0011 word is placed in the user defined octet following the Header Error Correction (HEC) octet location. If the 8 bit bus format is configured on the Output Cell Interface 62, the 8 bit pre/postpend in the SA=0011 word is the first appended octet. All other appended octets are sequenced in the enhanced UTOPIA data bus structure starting with the most significant octets of SA=1001 and ending with the least significant octet of SA=1010.

The header contents of each cell can be replaced or portions thereof altered. The location accessed by SA=1000 contains the new header. The VPI portion of the header, the VCI portion, or both can be replaced with new values recovered from the VC table once VC identification has been made. The PTI field is not modified by the translation process. Header translation can be disabled for cells passing through the Auxiliary Cell Interface. This provides the flexibility of passing cells from an ingress ATM layer device 10 to an egress ATM layer device 28 as shown in FIG. 1.

Each non-operating and management cell is routed according to its physical layer device ID field (PHY ID). The ATM layer device 10 issues a write enable signal to each physical layer device 14 in turn. If a given physical layer device 14 wishes to pass a cell on to the ATM layer device 10, its PHY ID field must match the index of the write enable signal used to transfer the cell into the ATM layer device 14.

The destination of each Operation and Management (OAM) cell depends on the type of OAM cell and whether the ATM layer device 14 is the end-point for that particular OAM flow. If the ATM layer device 10 is an end point, the default configuration terminates and processes all OAM cells except Activate/Deactivate and Loopback cells, which are routed to the Microprocessor Buffer 64. Activation/Deactivation cells are used by the management entity to implement the handshaking required to initiate or cease performance monitoring or continuity check processes. Loopback cells are returned at a specified endpoint to the originating source of the cell to verify connectivity.

Cell rate policing is performed according to a Virtual Scheduling Algorithm which polices any combination of user cells, OAM cells, high priority cells or low priority cells. The virtual scheduling algorithm updates a Theoretical Arrival Time (TAT), which is the "nominal" arrival time of the cell assuming equally spaced cells when the source is active. If the actual arrival time of a cell is not "too" early relative to the TAT, in particular if the actual arrival time is after TAT-L, then the cell is conforming, otherwise the cell is non-conforming.

The ATM layer device 10 maintains cell counts on a per VC basis and over the aggregate cell stream. The parameters stored are the number of low priority cells, the number of high priority cells, the number of CLP=1 cells violating the traffic contract (non-conforming), and the number of CLP=0 cells violating the traffic contract. The number of cells discarded by the policing function and the number of cells reduced from high to low priority can be derived from the above counts and other information. The low and high priority cell counts represent the state of the cells before policing. The violation counts can be used to derive the cell counts after policing.

Performance monitoring is effected by storing the forward monitoring and backward reporting parameters on a per-VC basis such as number of lost cells, number of misinserted cells, number of BIP-16 errors (the BIP-16 error detection code is a bit interleaved parity calculation using even parity) and the number of severely errored cell blocks.

The ATM layer device 10 terminates and monitors F4 (VPC) and F5 (VCC) OAM flows. Upon receipt of an OAM cell, the CRC-10 is checked. If the check sum is incorrect the OAM cell is discarded and the global errored OAM cell count is incremented. Otherwise, further processing is dependent upon the contents of the OAM Cell Type field. Activate/Deactivate and Loopback cells are passed to the microprocessor cell buffer 64 for external processing. If a connection is not provisioned as an end point, all incoming OAM cells with a correct CRC-10 are passed to the Output Cell Interface (subject to policing). At flow end points all OAM cells are terminated.

When used in ingress applications ATM layer devices 10 receive cells from multiple physical layer devices 14, processes them and passes them to a single ATM switch 12. Thus, in the ingress mode the ATM layer device 10 operates as a multiple physical layer device master on its input side, selecting between the physical layer devices based upon the availability of cells.

On the output side of an ingress ATM layer device 10, the latter operates as a single physical layer device slave. The output side informs the switch core if it has a cell available for transfer, and waits for the switch 12 to authorize that transfer. The entire output buffer space of the ATM layer device 10 is dedicated to buffering the transfer of cells to the switch 12. If this buffer becomes full as a result of the switch 12 being blocked, the ATM layer device 10 can either dump the oldest cell in the buffer, or apply back-pressure to all of its input physical layer devices 14, depending upon how it has been configured.

Another feature provided by the ATM layer devices operating in ingress mode is logical multicasting. Logical multi-casting involves the ATM layer device 10 copying the appropriate cell multiple times, with different cell headers each time and transferring each to the switch 12. When this is done the design takes into account the possibility that the input physical layer devices 14. May be backed-up as a result, with possible cell loss occurring.

When used in transparent egress mode the ATM layer device 28 operates like an independent "in-line" processor for cells coming from the ATM Switch 12 destined for each of the physical layer devices 14 in that device 28 operates like there is a separate ATM layer device for each physical layer device 14. The ATM layer device 28 appears to the switch like a separate entity attached to the front of each physical layer device 14. On the output side, the ATM layer device 28 operates as a multiple physical layer device master, selecting between the physical layer devices 14 based on indications of transmit buffer space availability.

The input side of the ATM layer device 28, operates like multiple physical layer device slaves. Device 28 splits its internal buffer space up between each of the physical layer devices 14 it is representing, and determines for each physical layer device whether there is more space available. When this determination has been made it is reflected back to the switch 12, separately for each physical layer device 14, as an indication of whether or not each physical layer device 14 has buffer space available. The switch 12 then authorizes cell transfers to each physical layer device 14. The overall result is a division of the ATM layer device 28 buffer space between the physical layer devices 14, with back-pressure occurring for any physical layer device 14 which fills its share.

In the egress routing mode the ATM layer device acts like an extension of the ATM switch, making the final routing of the cells to the multiple physical layer devices attached to it. Once the virtual channel (VC) of a cell is identified the corresponding VC table entry contains the physical layer device 14 to which that cell should be routed.

In routing mode the input side of the ATM layer device 28 operates as a single physical layer device slave. That is, as one ATM layer device 28 is accepting all of the ATM switch output for the physical layer devices 14, its output side operates as a multiple physical layer device master, selecting between the physical layer devices 14 based on their indicated buffer space availability.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

We claim:

1. An ATM layer device for interfacing between physical layer devices and an ATM switch, said ATM layer device comprising:
   (a) a single input cell interface couplable to a plurality of said physical layer devices in an ingress mode and to an output of said ATM switch in an egress mode;
   (b) an output cell interface couplable in an ingress mode to an input of said ATM switch and in an egress mode to said physical layer devices.
   wherein, in an ingress mode of operation, said input cell interface selects among the physical layer devices a physical layer device for cell transmission based upon the availability of cells from said physical layer devices.

2. A device according to claim 1, wherein said input cell interface is couplable, in an ingress mode, to said plurality of physical layer devices by a bus and said output interface is couplable, in an egress mode, to a plurality of physical layer devices by a bus.

3. A device according to claim 1, wherein, in an ingress mode of operation, said input cell interface selects among the physical layer devices a physical layer device for cell transmission based upon the availability of cells from said physical layer devices.

4. A device according to claim 1, including means for prepending and postpending of switch routing information to cells destined to enter said switch and for removing such information from cells having left said switch and means for selectively activating and deactivating said means for prepending and postpending.

5. A device according to claim 1, including a cell buffer coupled to said input cell interface.

6. A device according to claim 5, including an external RAM address look-up operative to look up cell addresses.

7. A device according to claim 2, wherein said output cell interface, when in an ingress mode, informs the ATM switch if it has a cell available for transfer and waits for the ATM switch to authorize transfer of the cell.

8. A device according to claim 1, wherein cells from a switch destined to a particular physical layer device are treated independently from any other cells destined to other physical layer devices, when said device is in a transparent egress mode, such that buffer space in said ATM layer device is split up among physical physical layer devices and for each physical layer device, it is determined if space is available and, if so, the ATM switch authorizes cell transfer to that physical layer device.

9. A device according to claim 2, wherein said output cell interface is couplable to a plurality of physical layer devices and said output cell interface selects between the plurality of physical layer devices based upon transmit buffer space available when said device is in an egress mode.

10. A device according to claim 1, including a cell processor and external ram address look-up for accessing an entry from a plurality of entries in a VC table based upon cell header information and a physical layer device address, said entry and said address used in combination to identify each received cell of said ATM cells.

11. A device according to claim 1, including a cell processor and external ram address look-up for accessing VPI/VCI translation tables contained in VC table entries of a VC table for translating cell headers.

12. A device according to claim 1, including a cell processor and external ram address look-up for accessing VPI/VCI policing information contained in table entries of a VC table for policing virtual channel specifications.

13. A device according to claim 1, including a cell processor and external ram address look-up for accessing VPI/VCI performance information contained in table entries of a VC table for monitoring performance.

14. A device according to claim 2, including an auxiliary cell interface and auxiliary cell FIFO buffer operative to provide a byte wide UTOPIA bus port and pass dropped or newly created cells to and from an external device.

15. A device according to claim 4, physical layer device address information is taken from a portion of the ATM layer device which controls which physical layer device from which to transfer a cell.

16. A method for interfacing between physical layer devices and an ATM switch, comprising:
   (a) in an ingress mode, transferring cells in sequence on a shared bus from a plurality of physical layer devices to an input cell interface of an ATM layer device each cell transfer from said physical layer devices being controlled by said ATM layer based upon the availability of cells from said physical layer devices;

(b) passing said cells uni-directionally through said ATM layer device;

(c) processing said cells in sequence as they arrive; and (d) outputting said cells after processing from an output cell interface of said ATM layer device to said ATM switch;

wherein a shared bus input couples said input cell interface to said plurality of physical layer devices.

17. A method according to claim 16, including prepending and postpending switch routing information to cells destined to enter said ATM switch and removing such information from cells having left said ATM switch.

18. A method according to claim 17, including selectively activating and deactivating the cell prepending and postpending.

19. A method according to claim 16, including simultaneously transferring a cell from the input cell interface to a 4 cell buffer, transferring a cell header and appended bytes from the 4 cell buffer to an external RAM address look-up, and performing a time-interleaved address look-up for more than one cell at a time.

20. A method according to claim 16, including, when in an ingress mode, informing the switch core if it has a cell available for transfer and transferring an available cell upon receipt of authorization being received from said switch core.

21. A method according to claim 16, wherein, in a transparent egress mode, allocating buffer space in said ATM layer device among physical layer devices and, for each physical layer device, determining if space is available and, if so, authorizing cell transfer to that physical layer device.

22. A method according to claim 16, wherein said output cell interface is couplable to a plurality of physical layer devices and an output cell interface selects between the plurality of physical layer devices based upon transmit buffer space available when in an egress mode.

23. A method according to claim 16, including translating cell headers by accessing VPI/VCI translation tables contained in VC table entries of a VC table.

24. A method according to claim 16, including policing virtual channel specifications utilizing a cell processor and external ram address look-up for accessing VPI/VCI policing information contained in table entries of a VC table.

25. A method according to claim 16, including monitoring performance which includes a cell processor and external ram address look-up for accessing VPI/VCI performance information contained in table entries of a VC table.

26. A method according to claim 16, including prepending and postpending physical layer device identification information and combining this identification information with VPI/VCI values when cell identification is made.

27. A device according to claim 6, wherein said cell addresses are looked up simultaneously for three cells at a time on a time interleaved basis.

28. An ATM switching system which includes an ATM switch, a plurality of physical layer devices and a pair of ATM layer devices each having an input and an output interface, an ingress ATM layer device interfacing between said physical layer devices and said ATM switch in an ingress mode and an egress ATM layer device interfacing between said physical layer devices and said ATM switch in an egress mode, comprising:

(a) a shared input bus coupling said plurality of physical layer devices to said input interface of said ingress ATM layer device;

(b) a shared output bus coupling said output interface of said egress ATM layer device and said plurality of physical layer devices;

wherein said ingress ATM layer device selects among said plurality of physical layer devices physical layer device for cell transmission based upon the availability of cells from said plurality of physical layer devices.

29. A system according to claim 28, including buffer memory coupled to said input cell interface of each of said ingress and egress ATM layer devices and said engress ATM layer device, in a routing mode, accepts all cells from said ATM switch and, in a transparent mode, apportions internal buffer memory space to each of said plurality of physical layer devices and determines independently for each of said physical layer devices if buffer space is available and, if available, informs said ATM switch which authorizes cell transfer from physical layer devices of said plurality of physical layer devices having cells available for transfer and ATM layer device internal buffer memory space available.

30. A system according to claim 28, wherein cell identification in said ingress ATM layer device is based upon a combination of VPI/VCI values and information as to which of said plurality of physical layer devices a cell was transmitted.

* * * * *

UNITED STATES PATENT AND TRADEMARK OFFICE
CERTIFICATE OF CORRECTION

PATENT NO. : 5,889,778
DATED : Mar. 30, 1999
INVENTOR(S) : Charles Kevin Huscroft, John R. Bradshaw, Kenneth M. Buckland, Riccardo G. Dorbolo and David W. Wong It is certified that error appears in the above-identified patent and that said Letters Patent is hereby corrected as shown below:

```
Column 2, line 10, after "and" insert a comma --,--;
          line 11, after "selects" insert --among the physical
                   layer devices a physical--;
          line 12, after "based" delete --devices a physical
                   layer device for cell transmission based--.
Column 7, line 5,  delete ".May" and substitute --14 may--;
          line 62, after "devices" delete --.-- and substitute
                   semi-colon --;--.
Column 8, line 29, after first "physical" delete --physical--.
Column 10, line 32, delete "engress" and substitute --egress--.
```

Signed and Sealed this

Twenty-third Day of November, 1999

Q. TODD DICKINSON

*Attest:*

*Attesting Officer*     *Acting Commissioner of Patents and Trademarks*